US012614497B2

(12) United States Patent
Oh

(10) Patent No.: US 12,614,497 B2
(45) Date of Patent: Apr. 28, 2026

(54) DISPLAY DEVICE AND OPERATING METHOD THEREOF

(71) Applicant: LG Display Co., Ltd., Seoul (KR)

(72) Inventor: SoonTaek Oh, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 12 days.

(21) Appl. No.: 18/801,210

(22) Filed: Aug. 12, 2024

(65) Prior Publication Data

US 2025/0182666 A1 Jun. 5, 2025

(30) Foreign Application Priority Data

Dec. 5, 2023 (KR) ........................ 10-2023-0173908

(51) Int. Cl.
*G09G 3/20* (2006.01)
*G09G 3/3291* (2016.01)

(52) U.S. Cl.
CPC ......... *G09G 3/2074* (2013.01); *G09G 3/3291* (2013.01); *G09G 2300/0452* (2013.01); *G09G 2320/0242* (2013.01); *G09G 2320/045* (2013.01)

(58) Field of Classification Search
CPC .. G09G 3/3233; G09G 3/3208; G09G 3/3225; G09G 3/2003; G09G 3/20; G09G 2330/021; G09G 2360/16; G09G 2360/145; G09G 2320/043; G09G 2320/045; G09G 2320/029; G09G 2320/0233; G09G 2320/048; G09G 2320/0242; G09G 2320/0666; G09G 2320/046; G09G 2320/0693; G09G 2320/0626; G09G 2320/041; G09G 2320/0295; G09G 2320/0285
See application file for complete search history.

(56) References Cited

U.S. PATENT DOCUMENTS

2014/0176403 A1* 6/2014 Inoue .................. G09G 3/2092
345/77
2018/0047326 A1* 2/2018 Tsuchida ............. G09G 3/2059
2022/0223092 A1* 7/2022 Lee ...................... G09G 3/2007

* cited by examiner

*Primary Examiner* — Dong Hui Liang
(74) *Attorney, Agent, or Firm* — Fenwick & West LLP

(57) ABSTRACT

A display device according to an embodiment of the present disclosure may include a first memory configured to store degradation information; a second memory configured to store degradation compensation data; a timing controller configured to, when receiving image data from a host system, compensate the image data using the degradation compensation data; and a display panel including a plurality of light emitting elements, and configured to display an image according to compensated image data using at least some of the plurality of light emitting elements, wherein the degradation compensation data is classified on the basis of light emitting colors of the plurality of light emitting elements.

17 Claims, 7 Drawing Sheets

| | | | | | | | | | | | | | | | | | | | | | | | |
|---|---|---|---|---|---|---|---|---|---|---|---|---|---|---|---|---|---|---|---|---|---|---|---|
| R1[7] | R1[6] | R1[5] | R1[4] | R1[3] | R1[2] | R1[1] | R1[0] | G1[7] | G1[6] | G1[5] | G1[4] | G1[3] | G1[2] | G1[1] | G1[0] | B1[7] | B1[6] | B1[5] | B1[4] | B1[3] | B1[2] | B1[1] | B1[0] |
| R2[7] | R2[6] | R2[5] | R2[4] | R2[3] | R2[2] | R2[1] | R2[0] | G2[7] | G2[6] | G2[5] | G2[4] | G2[3] | G2[2] | G2[1] | G2[0] | B2[7] | B2[6] | B2[5] | B2[4] | B2[3] | B2[2] | B2[1] | B2[0] |

FIG.4

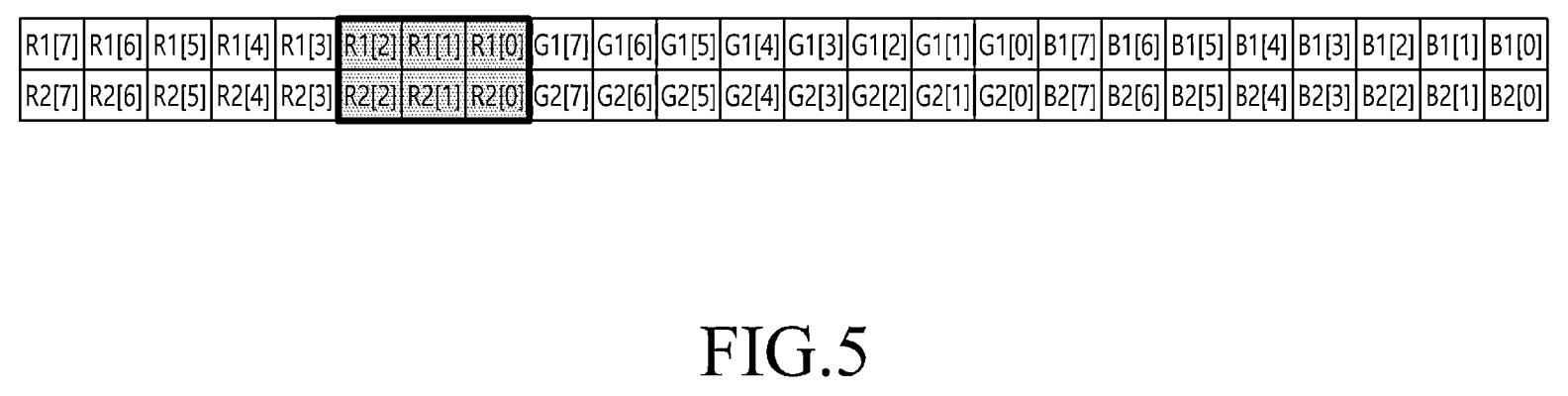

| | | | | | | | | | | | | | | | | | | | | | | | |
|---|---|---|---|---|---|---|---|---|---|---|---|---|---|---|---|---|---|---|---|---|---|---|---|
| R1[7] | R1[6] | R1[5] | R1[4] | R1[3] | R1[2] | R1[1] | R1[0] | G1[7] | G1[6] | G1[5] | G1[4] | G1[3] | G1[2] | G1[1] | G1[0] | B1[7] | B1[6] | B1[5] | B1[4] | B1[3] | B1[2] | B1[1] | B1[0] |
| R2[7] | R2[6] | R2[5] | R2[4] | R2[3] | R2[2] | R2[1] | R2[0] | G2[7] | G2[6] | G2[5] | G2[4] | G2[3] | G2[2] | G2[1] | G2[0] | B2[7] | B2[6] | B2[5] | B2[4] | B2[3] | B2[2] | B2[1] | B2[0] |

FIG.5

DISPLAY DEVICE AND OPERATING METHOD THEREOF

CROSS-REFERENCE TO RELATED APPLICATION

This application claims the benefit and priority to Korean Patent Application No. 10-2023-0173908 filed on Dec. 5, 2023 in the Republic of Korea, the entirety of which is hereby incorporated by reference for all purposes as if fully set forth herein.

TECHNICAL FIELD

Embodiments of the present disclosure relate to a display device and an operating method thereof, and more specifically, to a display device which performs degradation compensation and an operating method thereof.

DESCRIPTION OF RELATED ART

As technology develops in modern society, display devices are being used in various ways to provide information to users. The display devices may include not only an electronic sign which simply transfers visual information in one direction, but also various electronic devices which require higher technology to check a user's input and provide information in response to the checked input.

Representative examples of display devices may include a liquid crystal display device (LCD), a plasma display panel device (PDP), a field emission display device (FED), an electro luminescence display device (ELD), an electro-wetting display device (EWD) and an organic light emitting display device (OLED).

Among these, the organic light emitting display device displays an image using organic light emitting elements which are self-luminous elements. Therefore, compared to other display devices, the organic light emitting display device has the advantages of having a thinner thickness, a wider viewing angle and faster response speed. However, the organic light emitting elements of the organic light emitting display device may be degraded due to various causes, and when the organic light emitting elements are degraded, normal image display may be difficult, which may shorten the lifespan of the organic light emitting display device.

The description provided in the background section should not be assumed to be prior art merely because it is mentioned in or associated with the background section. The background section may include information that describes one or more aspects of the subject technology.

BRIEF SUMMARY

Embodiments of the present disclosure are directed to providing a display device which performs degradation compensation more effectively by considering the light emission colors and frequencies of light emitting elements, and a method for operating the same.

However, problems to be solved by the present disclosure are not limited to those mentioned above, and other technical problems to be solved may be inferred from embodiments to be described below.

A display device according to an embodiment of the present disclosure may include: a first memory configured to store degradation information; a second memory configured to store degradation compensation data; a timing controller configured to, when receiving image data from a host system, compensate the image data using the degradation compensation data; and a display panel including a plurality of light emitting elements, and configured to display an image according to compensated image data using at least some of the plurality of light emitting elements, wherein the degradation compensation data is classified on the basis of light emitting colors of the plurality of light emitting elements.

A method for operating a display device may include: generating degradation compensation data on the basis of degradation information stored in a first memory, and storing the generated degradation compensation data in a second memory; compensating, when receiving image data from a host system, the image data using the degradation compensation data stored in the second memory; and displaying an image according to compensated image data using at least some of a plurality of light emitting elements, wherein the degradation compensation data is classified on the basis of light emitting colors of the plurality of light emitting elements.

Specific details of other embodiments are included in the following detailed description and the accompanying drawings.

The display device and the method for operating the same according to the embodiments of the present disclosure may perform degradation compensation more effectively by considering the light emission colors and frequencies of light emitting elements.

Effects obtainable from the present disclosure may be non-limited by the above mentioned effects. Other unmentioned effects may be clearly understood from the following description by those having ordinary skill in the technical field to which the present disclosure pertains.

It is to be understood that both the foregoing general description and the following detailed description are exemplary and explanatory and are intended to provide further explanation of the inventive concepts as claimed.

DESCRIPTION OF DRAWINGS

The accompanying drawings, that may be included to provide a further understanding of the disclosure and may be incorporated in and constitute a part of the disclosure, illustrate embodiments of the disclosure and together with the description serve to explain various principles of the disclosure.

FIG. 4 shows an example of degradation compensation data according to an example embodiment of the present disclosure.

FIGS. 5 and 6 show examples of degradation compensation data used in a display device according to an example embodiment of the present disclosure.

Figure 1:
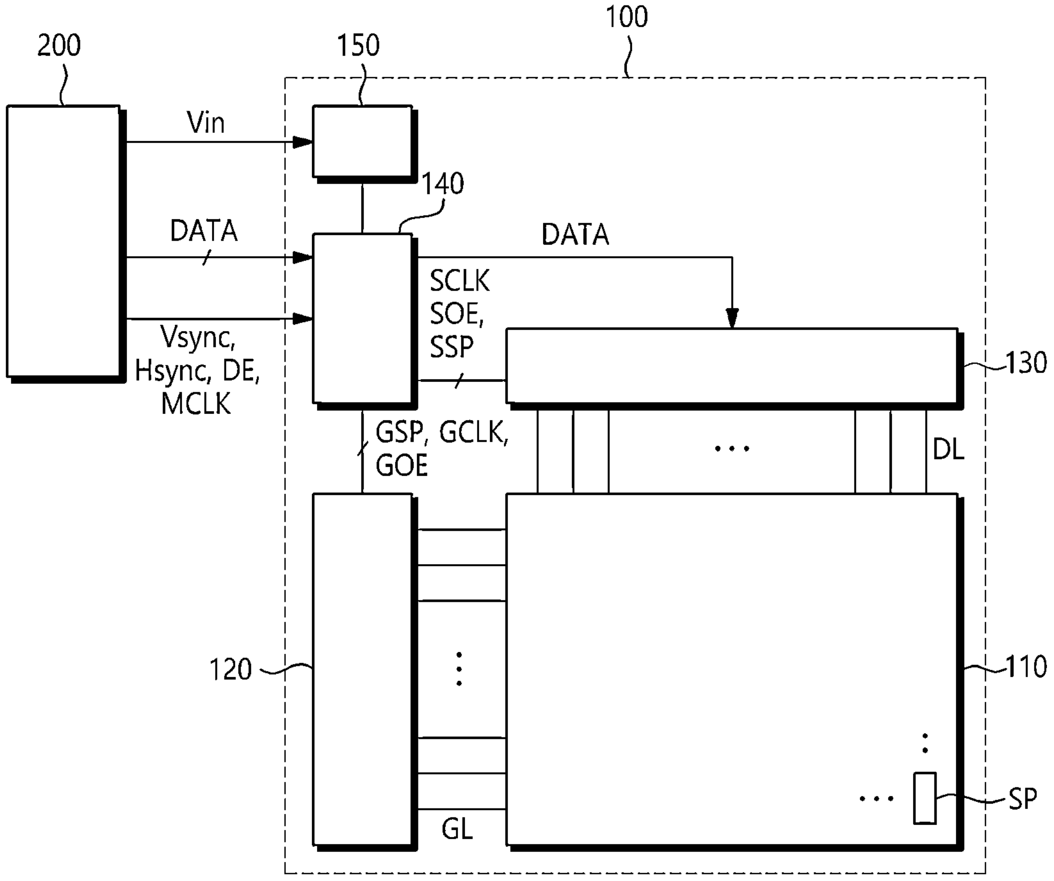
FIG. 1 is a functional block diagram of a display device according to an example embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations may be selected only for convenience of writing the specification and may be thus different from those used in actual products.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments may be provided so that this disclosure may be sufficiently thorough and complete to assist those skilled in the art to fully understand the scope of the present disclosure. Further, the present disclosure is only defined by scopes of claims. Any implementation described herein as an "example" is not necessarily to be construed as preferred or advantageous over other implementations.

Most of the terms used herein are general terms that have been widely used in the technical art to which the present disclosure pertains. However, some of the terms used herein may be created reflecting intentions of technicians in this art, precedents, or new technologies. Also, some of the terms used herein may be arbitrarily chosen by the present applicant. In this case, the meanings of these terms will be described in detail in corresponding description portions. Accordingly, the specific terms used herein should be understood based on the unique meanings thereof and the whole context of the present disclosure.

In the entire specification, when an element "includes" a component, it means that the element does not exclude another component but may further include another component, unless referred to the contrary.

The expression "at least one of a, b and c" described in the entire specification may include 'a,' 'b,' 'c,' 'a and b,' 'a and c,' 'b and c' or 'all of a, b and c.' Advantages and features of the present disclosure and methods to achieve them will become apparent from the descriptions of embodiments herein below with reference to the accompanying drawings.

Since the figures, shapes, sizes, areas, ratios, angles and numbers of elements given in the drawings to describe an embodiment of the present disclosure are merely illustrative, the embodiment of present disclosure is not limited to the illustrated matters. In describing an embodiment of the present disclosure, when it is determined that the detailed description of the related art may obscure the gist of the embodiment of the present disclosure, the detailed description will be omitted.

The terms such as 'comprise,' 'include,' 'have,' 'be made of,' etc. used herein are generally intended to allow other components to be added. As used herein, singular forms are intended to include plural forms unless the context clearly indicates otherwise. In addition, when interpreting components, they are interpreted to include the margin of error even if there is no separate explicit description.

In describing positional relationship, such as "an element A on an element B," "an element A above an element B," "an element A below an element B" and "an element A next to an element B," another element C may be disposed between the elements A and B unless a more limiting term, such as "immediate(ly)," "direct(ly)," or "close(ly)" is used. When an element or layer is referred to as "on" another element or layer, it includes instances where another layer or element is directly on top of or intervening with the other element.

Additionally, terms such as first, second, etc. are used to describe various components, but these components are not limited by the terms. These terms are used to merely distinguish one component from another component. Accordingly, as used herein, a first component may be a second component within the technical spirit of the present disclosure.

The area, length or thickness of each component described in the present specification is shown for the sake of convenience in explanation, and the present disclosure is not necessarily limited to the area and thickness of the shown component.

Features of various embodiments of the present disclosure may be combined partially or totally, technically various interactions and operations are possible, and the respective embodiments may be practiced individually or in combination.

The terms described below are terms defined in consideration of their functions in the implementation of the present disclosure. These terms may vary depending on the intention of a user or an operator or custom. Therefore, the definition should be made based on the overall contents of the present specification. For example, the term "part" or "unit" may apply, for example, to a separate circuit or structure, an integrated circuit, a computational block of a circuit device, or any structure configured to perform a described function as should be understood to one of ordinary skill in the art.

A transistor constituting a pixel circuit in the present disclosure includes at least one of oxide thin film transistor (oxide TFT), amorphous silicon TFT (a-Si TFT) and low temperature polysilicon (LTPS) TFT.

The following embodiments will be described focusing on an organic light emitting display device. However, embodiments of the present disclosure are not limited to the organic light emitting display device, and may also be applied to an inorganic light emitting display device including an inorganic light emitting material. For example, embodiments of the present disclosure may also be applied to a quantum dot display device.

Expressions such as 'first,' 'second' and 'third' are terms used to distinguish configurations for respective embodiments, and the embodiments are not limited to these terms. Therefore, it should be noted that even the same term may refer to a different configuration depending on an embodiment.

Hereinafter, embodiments of the present disclosure will be described with reference to the drawings.

FIG. 1 is a functional block diagram of a display device according to an embodiment of the present disclosure.

Referring to FIG. 1, the display device 100 according to the embodiment of the present disclosure may include a display panel 110 to which a plurality of gate lines GL and a plurality of data lines DL are connected and in which a plurality of subpixels SP are arranged in the form of a matrix, a gate driving circuit 120 which drives the plurality of gate lines GL, a data driving circuit 130 which supplies data voltages through the plurality of data lines DL, a timing controller 140 which controls the gate driving circuit 120 and the data driving circuit 130, and a power management circuit 150.

The display panel 110 displays an image on the basis of scan signals transferred through the plurality of gate lines GL from the gate driving circuit 120 and data voltages transferred through the plurality of data lines DL from the data driving circuit 130.

In the case of an organic light emitting display, the display panel 110 may be implemented in a top emission type, a bottom emission type or a dual emission type.

In the display panel 110, a plurality of pixels may be arranged in the form of a matrix, each pixel may include subpixels SP of different colors, for example, a white subpixel, a red subpixel, a green subpixel and a blue subpixel, and the respective subpixels SP may be defined by the plurality of data lines DL and the plurality of gate lines GL.

One subpixel SP may include a thin film transistor (TFT) which is formed in an area where one data line DL and one gate line GL intersect, a light emitting element, such as an organic light emitting diode, which is charged with a data voltage, and a storage capacitor which is electrically connected to the light emitting element to maintain a certain voltage.

For example, when the display device 100 having a resolution of 2,160×3,840 includes four subpixels SP of white (W), red (R), green (G) and blue (B), 2,160 gate lines GL and a total of 3,840×4=15,360 data lines DL by each of the 3,840 data lines DL connected to the four subpixels (WRGB) may be provided, and subpixels SP may be disposed at points, respectively, where the gate lines GL and the data lines DL intersect.

The gate driving circuit 120 is controlled by the timing controller 140, and controls driving timings for the plurality of subpixels SP by sequentially outputting scan signals to the plurality of gate lines GL disposed in the display panel 110.

The gate driving circuit 120 may include at least one gate driving integrated circuit (GDIC), and may be located on only one side or both sides of the display panel 110 depending on a driving scheme. Alternatively, the gate driving circuit 120 may be embedded in the bezel area of the display panel 110 to be implemented in a gate-in-panel (GIP) type.

The data driving circuit 130 receives image data DATA from the timing controller 140, and converts the received image data DATA into analog type data voltages. Then, by outputting a data voltage to each data line DL according to a timing at which a scan signal is applied through a gate line GL, the subpixel SP connected to the data line DL displays a light emitting signal of a luminance corresponding to the data voltage.

Similarly, the data driving circuit 130 may include at least one source driving integrated circuit (SDIC), and the source driving integrated circuit (SDIC) may be connected to bonding pads of the display panel 110 or be directly disposed on the display panel 110 in a tape automated bonding (TAB) type or a chip-on-glass (COG) type.

As the case may be, each source driving integrated circuit (SDIC) may be disposed in the display panel 110 by being integrated thereinto. Alternatively, each source driving integrated circuit (SDIC) may be implemented in a chip-on-film (COF) type. In this case, each source driving integrated circuit (SDIC) may be mounted on a circuit film, and may be electrically connected to the data lines DL of the display panel 110 through the circuit film.

The timing controller 140 supplies various control signals to the gate driving circuit 120 and the data driving circuit 130, and controls operations of the gate driving circuit 120 and the data driving circuit 130. In other words, the timing controller 140 controls the gate driving circuit 120 to output a scan signal according to a timing implemented in each frame, and on the other hand, transfers the image data DATA received from the outside to the data driving circuit 130.

Along with the image data DATA, the timing controller 140 receives various timing signals, including a vertical synchronization signal Vsync, a horizontal synchronization signal Hsync, a data enable signal DE and a main clock MCLK, from an external host system 200.

The host system 200 may be any one of a television (TV) system, a set-top box, a navigation system, a personal computer (PC), a home theater system, a mobile device and a wearable device, and the present disclosure is not limited thereto.

Accordingly, the timing controller 140 generates control signals using the various timing signals received from the host system 200, and transfers the control signals to the gate driving circuit 120 and the data driving circuit 130.

For example, in order to control the gate driving circuit 120, the timing controller 140 may output various gate control signals including a gate start pulse GSP, a gate clock GCLK and a gate output enable signal GOE. The gate start pulse GSP controls a timing at which the at least one gate driving integrated circuit (GDIC) constituting the gate driving circuit 120 starts an operation. The gate clock GCLK, as a clock signal which is inputted in common to the at least one gate driving integrated circuit (GDIC), controls the shift timing of a scan signal. The gate output enable signal GOE designates the timing information of the at least one gate driving integrated circuit (GDIC).

In order to control the data driving circuit 130, the timing controller 140 may output various data control signals including a source start pulse SSP, a source sampling clock SCLK and a source output enable signal SOE. The source start pulse SSP controls a timing at which the at least one source driving integrated circuit (SDIC) constituting the data driving circuit 130 starts data sampling. The source sampling clock SCLK is a clock signal which controls a timing for sampling data in the source driving integrated circuit (SDIC). The source output enable signal SOE controls the output timing of the data driving circuit 130.

The display device 100 may include the power management circuit 150 which supplies various voltages or currents to the display panel 110, the gate driving circuit 120 and the data driving circuit 130 or controls various voltages or currents to be supplied.

The power management circuit 150 regulates a DC input voltage Vin supplied from the host system 200 to generate power required for driving the display panel 110, the gate driving circuit 120 and the data driving circuit 130. The power management circuit 150 may be referred to as a power management integrated circuit (PMIC).

In an embodiment, each subpixel SP may be located at a point where a gate line GL and a data line DL intersect, and a light emitting element may be disposed in each subpixel SP. For example, an organic light emitting display device may include a light emitting element such as an organic light emitting diode in each subpixel SP, and may display an image by controlling a current flowing through the light emitting element according to a data voltage.

The display device 100 may be various types of devices such as a liquid crystal display, an organic light emitting display an inorganic light emitting display and a plasma display panel, but the present disclosure is not limited thereto.

Figure 2:
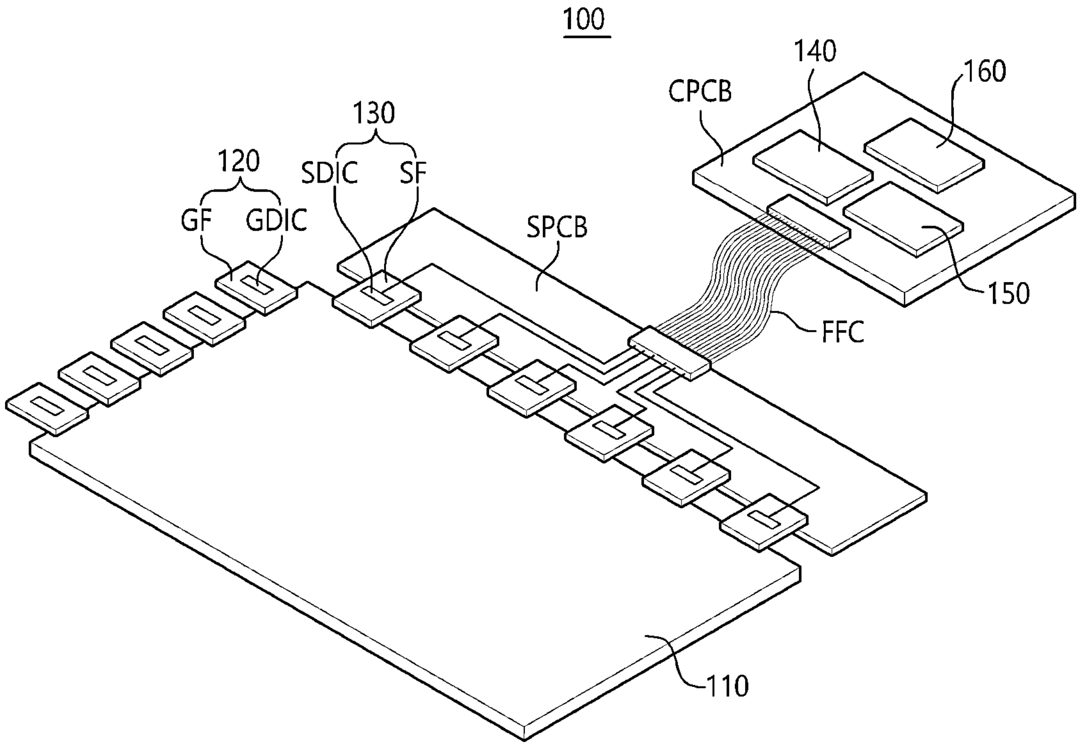
FIG. 2 is a diagram showing the schematic configuration of a display device according to an example embodiment of the present disclosure.

FIG. 2 is a diagram showing the schematic configuration of a display device according to an embodiment of the present disclosure.

Referring to FIG. 2, the display device 100 according to the embodiment of the present disclosure illustrates as an example a case where a source driving integrated circuit SDIC included in a data driving circuit 130 and a gate driving integrated circuit GDIC included in a gate driving circuit 120 are implemented in a chip-on-film (COF) type among various types TAB, COG and COF.

Each of one or more gate driving integrated circuits GDIC included in the gate driving circuit 120 may be mounted on a gate film GF, and one end of the gate film GF may be electrically connected to a display panel 110. Wirings for electrically connecting the gate driving integrated circuit GDIC and the display panel 110 may be disposed on the gate film GF.

The gate driving circuit 120 may be located on only one side or both sides of the display panel 110 depending on a driving method. Alternatively, the gate driving circuit 120 may be embedded in the bezel area of the display panel 110 to be implemented in a gate-in-panel (GIP) type.

Similarly, each of one or more source driving integrated circuits SDIC included in the data driving circuit 130 may be mounted on a source film SF, and one end of the source film SF may be electrically connected to the display panel 110. Wirings for electrically connecting the source driving integrated circuit SDIC and the display panel 110 may be disposed on the source film SF.

The display device 100 may include a printed circuit board for circuit connection between a plurality of source driving integrated circuits SDIC and other devices. The printed circuit board may include, for example, at least one source printed circuit board SPCB and a control printed circuit board CPCB for mounting control parts and various electrical devices.

In an embodiment, the other end of the source film SF on which the source driving integrated circuit SDIC is mounted may be connected to the at least one source printed circuit board SPCB. For example, one end of the source film SF on which the source driving integrated circuit SDIC is mounted may be electrically connected to the display panel 110, and the other end of the source film SF may be electrically connected to the source printed circuit board SPCB.

A timing controller 140, a power management circuit (a power management IC) 150 and a first memory (e.g., flash memory) 160 may be mounted on the control printed circuit board CPCB. The timing controller 140 may control operations of the data driving circuit 130 and the gate driving circuit 120. The timing controller 140 may perform degradation compensation on image data received from a host system. The power management circuit 150 may supply driving voltages or currents to the display panel 110, the data driving circuit 130 and the gate driving circuit 120, or may control voltages or currents to be supplied. The first memory 160 may store degradation information to compensate for degradation. The first memory 160 may be a nonvolatile memory device. The first memory 160 may not lose and maintain stored information even if power supply is cut off.

The at least one source printed circuit board SPCB and the control printed circuit board CPCB may be connected in terms of circuit by at least one connection member. The connection member may be, for example, a flexible printed circuit (FPC) or a flexible flat cable FFC. The connection member which connects the at least one source printed circuit board SPCB and the control printed circuit board CPCB may be variously changed depending on the size and type of the display device 100. The at least one source printed circuit board SPCB and the control printed circuit board CPCB may be implemented by being integrated into a single printed circuit board.

In the case of the display device 100 configured as described above, the power management circuit 150 transfers a driving voltage required for display driving or characteristic value sensing to the source printed circuit board SPCB through the flexible printed circuit (FPC) or the flexible flat cable FFC. The driving voltage transferred to the source printed circuit board SPCB is supplied through the source driving integrated circuit SDIC to cause light emission of or sense a specific subpixel SP in the display panel 110.

Figure 3:
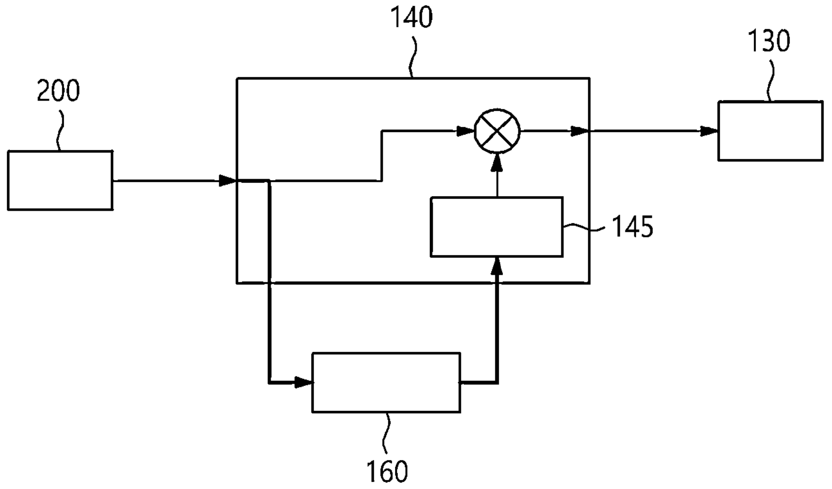
FIG. 3 is a diagram for explaining a display device according to an example embodiment of the present disclosure.

FIG. 3 is a diagram for explaining a display device according to an embodiment of the present disclosure. FIG. 3 is a diagram for explaining a degradation compensation operation performed in a timing controller 140 according to the embodiment of the present disclosure. Hereinafter, content that overlaps the previously described content may be omitted or may be briefly provided.

The display device may include a data driving circuit 130, the timing controller 140, and a first memory 160. The timing controller 140 may include a second memory 145. The display device may be connected to a host system 200. The data driving circuit 130, the timing controller 140 and the first memory 160 may be connected to each other.

The timing controller 140 may receive image data from the host system 200. The image data received from the host system 200 represents an image (or a video) to be displayed through a display panel.

In an embodiment, when receiving the image data, the timing controller 140 may transmit the received image data to the first memory 160. The first memory 160 may store the received image data. The first memory 160 may continuously receive and accumulate image data. Degradation information may be prepared on the basis of accumulated image data. In other words, by the accumulated image data, a part where a light emitting element has continuously emitted light may be known, and information on such a part may correspond to degradation information.

The timing controller 140 may include the second memory 145. The second memory 145 may store degradation compensation data. The second memory 145 may maintain data stored therein while power is supplied. When power is supplied, the second memory 145 may store degradation compensation data generated on the basis of the degradation information of the first memory 160. Degradation compensation data may be generated by the timing controller 140, but is not limited thereto.

In an embodiment, the degradation compensation data may include data for respective light emitting colors of light emitting elements. For example, the degradation compensation data may include red data, green data and blue data. In this case, the size of at least a part of the red data, the green data and the blue data may be different from the sizes of the other parts. For example, the numbers of bits of the red data, the green data and the blue data may be different from each other. For another example, the size (or the number of bits) of the red data may be smaller than the sizes of the green data and the blue data. For still another example, the size of the red data may be smaller than the sizes of the green data and the blue data, and the size of the green data may be smaller than the size of the blue data.

In an embodiment, the degradation compensation data may be classified by frequency values. For example, the degradation compensation data may be classified on the basis of the light emitting colors of a plurality of light emitting elements within a first frequency range. The degradation compensation data may be common within a second frequency range. A frequency value corresponding to the first frequency range may be greater than a frequency value corresponding to the second frequency range.

In an embodiment, the degradation compensation data may be classified by a light emitting color and a frequency value. For example, red data may have a smallest size of degradation compensation data. Green data and blue data may have the same size. In addition, green data and blue data may have different values within the first frequency range. However, within the second frequency range, green data and blue data may have the same value. Alternatively, the values of green data and blue data may be omitted within the second frequency range.

Degradation compensation data may have characteristics that are sensitive to a high-frequency component and insensitive to a low-frequency component. In this case, by leaving data effective for degradation compensation and reducing data relatively less effective for degradation compensation, the size of the second memory 145 may be reduced. For example, in the embodiments of the present disclosure, frequency may also be referred to as data frequency and may refer to speed related to data storage or processing. For example, the degradation compensation data may include degradation compensation data of a high frequency component and degradation compensation data of a low frequency component. The deterioration compensation data of high frequency components may have frequency characteristics that require a relatively high data frequency (fast speed), and the deterioration compensation data of low frequency components may have frequency characteristics that require a relatively low data frequency (slow speed).

Figure 6:
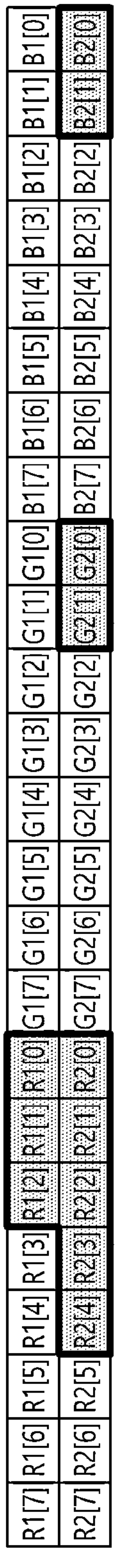

For more specific examples of degradation compensation data, reference may be made to FIGS. 4 to 6.

The timing controller 140 may compensate image data using the degradation compensation data. The image data may be data received from the host system 200 to display an image on the display panel. For example, when receiving image data from the host system 200, the timing controller 140 may store the image data in the first memory 160 so that degradation information is updated. The timing controller 140 may compensate the received image data using the degradation compensation data stored in the second memory 145.

The timing controller 140 may provide compensated image data to the data driving circuit 130.

The data driving circuit 130 may receive image data on which degradation compensation has been performed, from the timing controller 140. The image data received from the timing controller 140 may be digital data. The data driving circuit 130 may convert such digital data into analog data so that an image (or a video) corresponding to the image data is displayed on the display panel.

FIG. 4 shows an example of degradation compensation data.

Referring to FIG. 4, degradation compensation data may be prepared for respective data having different colors. The degradation compensation data may store information of the same size for each light emitting color. For example, the degradation compensation data may have 8 bits, for example, R1[0] to R1[7], for red data of a first pixel, 8 bits, for example, G1[0] to G1[7], for green data of the first pixel and 8 bits, for example B1[0] to B1[7], for blue data of the first pixel. Likewise, the degradation compensation data may have 8 bits, for example, R2[0] to R2[7], for red data of a second pixel, 8 bits, for example, G2[0] to G2[7], for green data of the second pixel and 8 bits, for example, B2[0] to B2[7], for blue data of the second pixel. It is to be noted that the number of bits for the degradation compensation data is described as 8 bits by way of example, and may be changed to 9 or more bits, or 7 or less bits, when necessary. Thus, the present disclosure is not limited thereto.

The size of degradation compensation data when the degradation compensation data has, in this way, data of the same size for all colors may be larger than the size of degradation compensation data (see FIGS. 5 and 6) when the degradation compensation data has different sizes by reflecting characteristics of respective colors. The size of the second memory 145 included in the timing controller 140 may be determined depending on the size of the degradation compensation data. For example, if the size of the degradation compensation data decreases, the size of the second memory 145 may also decrease.

If the size of the second memory 145 decreases, the amount of information used to display an image is reduced, and thus, the driving efficiency of the display device may be improved. In addition, since the size of the timing controller 140 including the second memory 145 may be reduced, it is possible to implement a light and thin bezel. Hereinafter, degradation compensation data of a reduced size used in an embodiment of the present disclosure will be described with reference to FIGS. 5 and 6.

FIGS. 5 and 6 show examples of degradation compensation data used in a display device according to an embodiment of the present disclosure.

FIG. 5 shows an example of degradation compensation data generated by reflecting the light emitting colors of light emitting elements.

The light emitting colors of a plurality of light emitting elements included in a display panel may be red, green and blue. For example, the plurality of light emitting elements may include a red light emitting element which emits red, a green light emitting element which emits green and a blue light emitting element which emits blue.

The plurality of light emitting elements show differences in degradation characteristics depending on a light emitting color. For example, among red, green and blue light emitting elements, the red light emitting element may have characteristics most resistant to degradation. For example, when the red, green and blue light emitting elements emit light for the same time, the degradation degrees of the green and blue light emitting elements may be more serious than that of the red light emitting element.

In the degradation compensation data according to the embodiment of FIG. 5, by reflecting the degradation characteristics of the light emitting elements depending on a light emitting color, some data may be omitted in the case of red data. For example, as shown, in the case of the red data, data corresponding to 0, 1 and 2 for each of red light emitting elements (e.g., R1[0], R1[1] and R1[2] of a first red light emitting element and R2[0], R2[1] and R2[2] of a second red light emitting element) may be omitted. In an example, the data corresponding to 0, 1 and 2 for each of red light emitting elements being omitted means that these data may be inferred as zero or one by default, but the present disclosure is not limited thereto.

In an embodiment, a first pixel may have a first subpixel including a first red light emitting element, a second subpixel including a first green light emitting element and a third subpixel including a first blue light emitting element. When the degradation compensation data as shown in FIG. 4 is used, since degradation compensation data corresponding to 8 bits for each subpixel is required, the second memory 145 is required to have a size of at least 24 bits. On the other hand, when the degradation compensation data of FIG. 5 is used, since degradation compensation data corresponding to 5 bits is required for the first subpixel as 3 bits are omitted, the second memory 145 only needs to have a size of at least 21 bits.

In other words, in the case of FIG. 5, since degradation compensation data is prepared by reflecting degradation characteristics according to the light emitting colors of the light emitting elements, the second memory 145 may be used more efficiently. The effects associated with this are not limited to those mentioned in the present specification, and there may be various other effects that may be inferred by those skilled in the art.

The degradation compensation data according to the embodiment of FIG. 5 represents an example that reflects the light emitting colors of light emitting elements, and the number of bits to be omitted may vary depending on the degradation characteristics of each color.

FIG. 6 shows an example of degradation compensation data generated by reflecting the light emitting colors and frequency characteristics of light emitting elements. FIG. 6 is an example of degradation compensation data obtained by reflecting frequency characteristics in addition to FIG. 5.

Referring to FIG. 6, by reflecting frequency characteristics, bits corresponding to 0 and 1 for each light emitting color may be omitted in a specific frequency range, for example, the lower frequency range. For example, for the second pixel, R2[0] and R2[1] may be omitted in the red data, G2[0] and G2[1] may be omitted in the green data, and B2[0] and B2[1] may be omitted in the blue data. It is to be noted that although FIGS. 4-6 only show the degradation compensation data for the first and second pixels, such configuration of the degradation compensation data may be equally applied to other pixels within the display panel, and the present disclosure is not limited thereto.

In an embodiment, omitted data may correspond to low frequency components. A low frequency range for data omission may be designated in advance. For example, when an entire frequency range is divided into ranges from 0 to 7, a low frequency range may be a range corresponding to 0 and 1 in the entire frequency range. However, this is nothing but a mere example, and the embodiment of the present disclosure is not limited thereto.

In an embodiment, a low frequency range may be left for only one color among all light emitting colors, and may be omitted for the other colors. For example, in the degradation compensation data, R2[0] and R2[1] may be left to be used in common, and G2[0], G2[1], B2[0] and B2[1] may be omitted. For another example, in the degradation compensation data, G2[0] and G2[1] or B2[0] and B2[1] may be left to be used in common, and the other data within the same frequency range may be omitted.

In the display device according to the embodiment of the present disclosure, by omitting at least a part of degradation compensation data in consideration of frequency characteristics, the second memory 145 which stores the degradation compensation data may be efficiently used. Accordingly, the operating efficiency of the display device may be improved, and the size of the bezel of the display device may be reduced.

R1[0], R1[1], R1[2], R2[2], R2[3] and R2[4] which are omitted in the red data shown in FIG. 6 may mean data omitted on the basis of the characteristics of a red color as described above with reference to FIG. 5. However, this is nothing but a mere example, and the embodiment of the present disclosure is not limited thereto and other bits of the red data may be omitted according to an embodiment.

Figure 7:
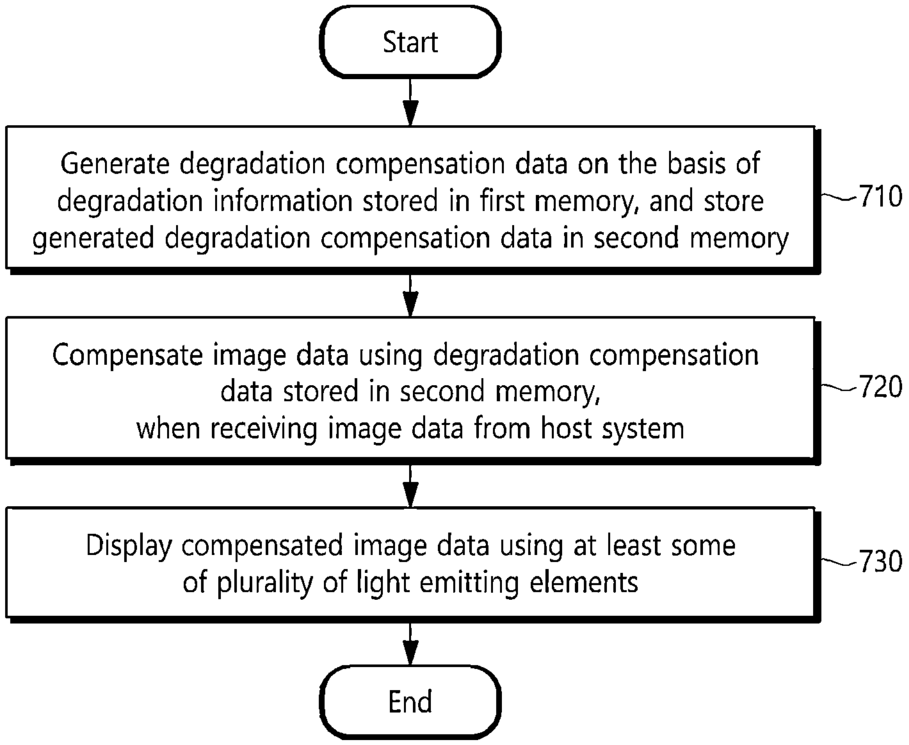
FIG. 7 is a flowchart showing respective steps of a method for operating a display device according to an example embodiment of the present disclosure.

FIG. 7 is a flowchart showing respective steps of a method for operating a display device according to an embodiment of the present disclosure.

Referring to FIG. 7, in step 710, the display device may generate degradation compensation data on the basis of degradation information stored in a first memory, and may store the generated degradation compensation data in a second memory.

The display device may receive image data from a host system. When receiving the image data from the host system, the display device may store the image data in the first memory and display the image data on a display panel. The first memory may accumulate received image data, and degradation information may be generated on the basis of accumulated image data and be stored in the first memory.

In an embodiment, the first memory may include a flash memory. The first memory may be a memory device which stores information regardless of whether power is inputted to the display device. However, this is nothing but a mere example, and the embodiment of the present disclosure is not limited thereto.

The display device (e.g., the timing controller) may generate the degradation compensation data using the degradation information stored in the first memory. The degradation information may include information on a pixel which is estimated, through image data accumulation, to have been degraded. The degradation information may be prepared on the basis of accumulated image data. The degradation compensation data is data to be used for degradation compensation, and the display device may generate the degradation compensation data on the basis of the light emitting colors and/or frequency characteristics of light emitting elements. The generated degradation compensation data may be stored in the second memory.

In an embodiment, the second memory may include an SRAM. The second memory may be a memory device which operates when power is inputted to the display device. Accordingly, when power input to the display device is stopped, data stored in the second memory may be lost. However, this is nothing but a mere example, and the embodiment of the present disclosure is not limited thereto.

In step 720, when receiving image data from the host system, the display device may compensate the image data using the degradation compensation data stored in the second memory.

In an embodiment, image data stored in the first memory may be transferred to the display panel for display on the display panel in parallel with storage in the first memory. Before the image data is transferred to the display panel, the display device may compensate the image data using the degradation compensation data stored in the second memory.

In an embodiment, the display device may compensate the image data by multiplying, reflecting or adding the degradation compensation data to the image data. As a method for compensating image data using degradation compensation data, various methods other than the method described above in the present specification may be applied, and the embodiments of the present disclosure are not limited thereto.

In step 730, the display device may display compensated image data using at least some of a plurality of light emitting elements. The display device may cause at least some of the plurality of light emitting elements to emit light, using image data provided to the display panel. Accordingly, the image data may be displayed on the display panel.

The display device according to the above-described embodiments of the present disclosure may be briefly described again as follows.

A display device according to an embodiment of the present disclosure may include a first memory configured to store degradation information; a second memory configured to store degradation compensation data; a timing controller configured to, when receiving image data from a host system, compensate the image data using the degradation compensation data; and a display panel including a plurality of light emitting elements, and configured to display an image according to compensated image data using at least some of the plurality of light emitting elements, wherein the degradation compensation data is classified on the basis of light emitting colors of the plurality of light emitting elements.

In an embodiment, a size of the degradation compensation data for one of the plurality of light emitting elements emitting a first color may be different from that of the degradation compensation data for another one of the plurality of light emitting elements emitting a second color different from the first color.

The second memory may be included in the timing controller.

In an embodiment, the plurality of light emitting elements may include a red light emitting element, a green light emitting element and a blue light emitting element, the degradation compensation data may include red data, green data and blue data, and a size of the red data may be smaller than sizes of the green data and the blue data.

The red data may be degradation compensation data for compensating image data required when driving a subpixel for emitting the red light emitting element, the green data may be degradation compensation data for compensating image data required when driving a subpixel for emitting the green light emitting element, and the blue data may be degradation compensation data for compensating image data required when driving a subpixel for emitting the blue light emitting element.

In an embodiment, a size of the green data may be smaller than a size of the blue data.

In an embodiment, the degradation compensation data may be further classified by frequency values.

In an embodiment, the degradation compensation data may be classified on the basis of the light emitting colors of the plurality of light emitting elements within a first frequency range.

In an embodiment, the degradation compensation data may be common within a second frequency range, and a frequency value corresponding to the first frequency range may be greater than a frequency value corresponding to the second frequency range.

In an embodiment, the image data may be continuously received and accumulated in the first memory such that the degradation information is prepared based on the accumulated image data.

A method for operating a display device according to an embodiment of the present specification may include generating degradation compensation data on the basis of degradation information stored in a first memory, and storing the generated degradation compensation data in a second memory; compensating, when receiving image data from a host system, the image data using the degradation compensation data stored in the second memory; and displaying an image according to compensated image data using at least some of a plurality of light emitting elements, wherein the degradation compensation data is classified on the basis of light emitting colors of the plurality of light emitting elements.

In an embodiment, the plurality of light emitting elements may include a red light emitting element, a green light emitting element and a blue light emitting element, the degradation compensation data may include red data, green data and blue data, and a size of the red data may be smaller than sizes of the green data and the blue data.

In an embodiment, a size of the green data may be smaller than a size of the blue data.

In an embodiment, the degradation compensation data may be further classified by frequency values.

In an embodiment, the degradation compensation data may be classified on the basis of the light emitting colors of the plurality of light emitting elements within a first frequency range.

In an embodiment, the degradation compensation data may be common within a second frequency range, and a frequency value corresponding to the first frequency range may be greater than a frequency value corresponding to the second frequency range.

A display device according to another embodiment of the present disclosure may include a first memory configured to store degradation information; a second memory configured to store degradation compensation data; a timing controller configured to, when receiving image data from a host system, compensate the image data using the degradation compensation data; and a display panel including a plurality of light emitting elements, and configured to display an image according to compensated image data using at least some of the plurality of light emitting elements, wherein the degradation compensation data is prepared by reflecting degradation characteristics on the basis of light emitting colors of the plurality of light emitting elements.

In an embodiment, the degradation compensation data may be prepared by further reflecting frequency characteristics of the plurality of light emitting elements.

Although embodiments of the present disclosure have been described in more detail with reference to the accompanying drawings, the present disclosure is not necessarily limited to these embodiments, and various modifications may be made without departing from the technical spirit of the present disclosure. Therefore, the embodiments disclosed above and in the accompanying drawings should be considered in a descriptive sense only and not for limiting the technical spirit of the present disclosure. The scope of the technical spirit of the present disclosure is not limited by the embodiments and the accompanying drawings. Therefore, it should be understood that the embodiments described above are given as examples in all respects and not restrictive. The spirit and scope of the present disclosure should be interpreted by the appended claims and encompass all equivalents falling within the scope of the appended claims.

What is claimed is:

1. A display device comprising:
a first memory configured to store degradation information;
a second memory configured to store degradation compensation data;
a timing controller configured to compensate the image data using the degradation compensation data when receiving image data from a host system; and
a display panel including a plurality of light emitting elements, and configured to display an image according to the compensated image data using at least some of the plurality of light emitting elements,
wherein the degradation compensation data is classified on the basis of light emitting colors of the plurality of light emitting elements, and
wherein a size of the degradation compensation data for one of the plurality of light emitting elements emitting a first color is smaller than the size of the degradation compensation data for another one of the plurality of light emitting elements emitting a second color different from the first color having lower resistance to degradation than the first color.

2. The display device of claim 1, wherein the degradation compensation data is further classified by frequency values.

3. The display device of claim 2, wherein the degradation compensation data is classified on the basis of the light emitting colors of the plurality of light emitting elements within a first frequency range.

4. The display device of claim 3, wherein
the degradation compensation data is common within a second frequency range, and
a frequency value corresponding to the first frequency range is greater than a frequency value corresponding to the second frequency range.

5. The display device of claim 1, wherein
the plurality of light emitting elements comprise a red light emitting element, a green light emitting element and a blue light emitting element,
the degradation compensation data comprises red data, green data and blue data, and
a size of the red data is smaller than sizes of the green data and the blue data.

6. The display device of claim 5, wherein a size of the green data is smaller than a size of the blue data.

7. The display device of claim 1, wherein the second memory is included in the timing controller.

8. The display device of claim 1, wherein the image data is continuously received and accumulated in the first memory such that the degradation information is prepared based on the accumulated image data.

9. A method for operating a display device, comprising:
generating degradation compensation data on the basis of degradation information stored in a first memory, and storing the generated degradation compensation data in a second memory;
compensating the image data using the degradation compensation data stored in the second memory when receiving image data from a host system; and
displaying an image according to the compensated image data using at least some of a plurality of light emitting elements,
wherein the degradation compensation data is classified on the basis of light emitting colors of the plurality of light emitting elements, and
wherein a size of the degradation compensation data for one of the plurality of light emitting elements emitting a first color is smaller than the size of the degradation compensation data for another one of the plurality of light emitting elements emitting a second color different from the first color having lower resistance to degradation than the first color.

10. The method of claim 9, wherein the degradation compensation data is further classified by frequency values.

11. The method of claim 10, wherein the degradation compensation data is classified on the basis of the light emitting colors of the plurality of light emitting elements within a first frequency range.

12. The method of claim 11, wherein
the degradation compensation data is common within a second frequency range, and
a frequency value corresponding to the first frequency range is greater than a frequency value corresponding to the second frequency range.

13. The method of claim 9, wherein
the plurality of light emitting elements comprise a red light emitting element, a green light emitting element and a blue light emitting element,
the degradation compensation data comprises red data, green data and blue data, and
a size of the red data is smaller than sizes of the green data and the blue data.

14. The method of claim 13, wherein a size of the green data is smaller than a size of the blue data.

15. The method of claim 9, wherein the image data is continuously received and accumulated in the first memory such that the degradation information is prepared based on the accumulated image data.

16. A display device comprising:
a first memory configured to store degradation information;
a second memory configured to store degradation compensation data;
a timing controller configured to compensate the image data using the degradation compensation data when receiving image data from a host system; and
a display panel including a plurality of light emitting elements, and configured to display an image according to the compensated image data using at least some of the plurality of light emitting elements,
wherein the degradation compensation data is prepared by reflecting degradation characteristics on the basis of light emitting colors of the plurality of light emitting elements, and
wherein a size of the degradation compensation data for one of the plurality of light emitting elements emitting a first color is smaller than the size of the degradation compensation data for another one of the plurality of light emitting elements emitting a second color different from the first color having lower resistance to degradation than the first color.

17. The display device of claim 16, wherein the degradation compensation data is prepared by further reflecting frequency characteristics of the plurality of light emitting elements.

* * * * *